United States Patent
Haren et al.

(10) Patent No.: US 6,192,442 B1
(45) Date of Patent: *Feb. 20, 2001

(54) INTERRUPT CONTROLLER

(75) Inventors: Kenneth C. Haren, Beaverton; Tuan Quach, Portland, both of OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/069,437

(22) Filed: Apr. 29, 1998

(51) Int. Cl.$^7$ .................................................. G06F 13/14
(52) U.S. Cl. ........................................ 710/269; 710/260
(58) Field of Search .................... 711/173; 710/260–269; 714/726

(56) References Cited

U.S. PATENT DOCUMENTS

| | | | |
|---|---|---|---|
| 4,349,872 | * | 9/1982 | Fukasawa et al. . |
| 5,057,997 | * | 10/1991 | Chang et al. .......................... 709/108 |
| 5,109,513 | * | 4/1992 | Otsuka .................................. 710/269 |
| 5,146,595 | * | 9/1992 | Fujiyama et al. ..................... 710/263 |
| 5,291,606 | * | 3/1994 | Okayama et al. ..................... 710/261 |
| 5,371,872 | * | 12/1994 | Larsen et al. ......................... 711/118 |
| 5,481,725 | * | 1/1996 | Jayakumar et al. .................... 710/48 |
| 5,511,200 | * | 4/1996 | Jayakumar ............................ 710/266 |
| 5,623,494 | * | 4/1997 | Rostoker et al. ...................... 370/397 |
| 5,678,057 | * | 10/1997 | Rostoker et al. ....................... 712/11 |
| 5,721,868 | * | 2/1998 | Yung et al. ........................... 711/149 |
| 5,727,217 | * | 3/1998 | Young ................................... 710/260 |
| 5,758,169 | * | 5/1998 | Nizar et al. ........................... 710/266 |
| 5,781,128 | * | 7/1998 | Shlomot ................................. 341/51 |
| 5,819,096 | * | 10/1998 | Nelson et al. ......................... 710/260 |
| 5,857,090 | * | 1/1999 | Davis et al. ........................... 395/500 |
| 5,881,294 | * | 3/1999 | Downey et al. ....................... 710/260 |

* cited by examiner

Primary Examiner—Paul R. Myers
(74) Attorney, Agent, or Firm—Trop, Pruner & Hu, P.C.

(57) ABSTRACT

An interrupt controller includes conductors for receiving interrupt request signals, a memory, a register and control logic. Each of the interrupt request signals are capable of indicating an interrupt request. The memory is capable of storing information about the interrupt request signals, and the register is writable to identify a set of locations of the memory for scanning. The control logic scans the set of locations for interrupt requests and does not scan other locations of the memory for interrupt requests. In some cases, the number of interrupt request signals are exceeds the number of locations. For these cases, information about selected interrupt signals are stored in the locations.

26 Claims, 8 Drawing Sheets

| RTE[x] | CONTENTS |
|---|---|
| X=63 | INTIN[47] OR SMIOUT# OR INTAS[15] |
| X=62 ... X=48 | INTIN[46:32] OR INTAS[14:0] |
| X=47 ... X=16 | INTIN[31:0] |
| X=15 ... X=0 | INTIO[15:0] |

| RTEDIS [2:0] | RTEs REMOVED FROM SCAN | SCAN SEQUENCE |
|---|---|---|
| 000 | NONE | 0-63, 0-63, 0-63, ... |
| 001 | 56-62 | 0-55, 63, 0-55, 63, ... |
| 010 | 48-62 | 0-47, 63, 0-47, 63, ... |
| 011 | 40-62 | 0-39, 63, 0-39, 63, ... |
| 100 | 32-62 | 0-31, 63, 0-31, 63, ... |
| 101 | 24-62 | 0-23, 63, 0-23, 63, ... |
| 110 | 16-62 | 0-15, 63, 0-15, 63, ... |
| 111 | 8-62 | 0-7, 63, 0-7, 63, ... |

INTERRUPT CONTROLLER

BACKGROUND

The invention relates to an interrupt controller.

A device (a disk controller, for example) of a computer system might interact with a microprocessor of the system to perform a specific function (retrieval of data from a hard drive, for example). In this interaction, the device might need to temporarily interrupt ongoing operations of the microprocessor so that the microprocessor may service the device.

For example, the microprocessor might instruct a disk controller to retrieve a block of data from a hard disk drive, and while the disk controller is retrieving the data, the microprocessor might perform other operations, such as executing program code, for example. After the controller retrieves the data and stores the data in a system memory, the controller then might notify the microprocessor.

One way for the controller to notify the microprocessor is to generate an interrupt request. In response to the interrupt request, the microprocessor typically temporarily suspends any ongoing operations to, for example, read the data from the system memory and make decisions based on the data.

An interrupt request is typically communicated via an interrupt request signal. For an edge triggered interrupt request, the interrupt request signal changes logical states (changes from a high logical state to a low logical state, for example) to indicate the interrupt request. A level triggered interrupt request is typically indicated by the logical state (either high or low) of the interrupt request signal. Thus, an edge triggered interrupt request is indicated by a predetermined transition of the interrupt request signal, and a level triggered interrupt request is indicated by a predetermined logic level of the interrupt request signal.

A typical computer system has many devices that may need the attention of the microprocessor and thus, has many devices that may generate interrupt requests. However, the microprocessor may have only one interrupt request input pin and thus may only process one interrupt request at a time. To solve this dilemma, the computer system might have an interrupt controller to receive interrupt request signals from the devices, prioritize any interrupt requests that are indicated by these signals, and direct one interrupt request at time to the microprocessor for servicing.

One such interrupt controller may be the 8259A programmable interrupt controller made by Intel. The 8259A interrupt controller may receive up to eight different interrupt request signals on its eight interrupt input pins. Because many interrupt requests may occur during a short interval of time, the 8259A controller prioritizes the interrupt requests and (via an output interrupt request signal) furnishes indications of the requests one at a time to the interrupt request input pin of the microprocessor.

When the interrupt controller activates the interrupt request input pin of the microprocessor to indicate an interrupt request, an interrupt acknowledge sequence begins. During this sequence, the 8259A interrupt controller furnishes an interrupt value that is received by the microprocessor. For the microprocessor, the interrupt value identifies the interrupt signal that generated the interrupt request and serves as an index to a location in an interrupt vector table. This location stores the address of an interrupt handler routine which the microprocessor may execute to service the interrupt request. To process more than eight interrupt request signals, two or more of the 8259A interrupt controllers may be cascaded together in what is often called a master-slave arrangement.

The 8259A was primarily designed for use with only one microprocessor. Referring to FIG. 1, a multiprocessor computer system 8 might alternatively use an interrupt controller 10, such as an I/O Advanced Programmable Interrupt Controller (IOAPIC), Part No. 82093AA, that is made by Intel. The interrupt controller 10 communicates interrupt information with microprocessors 12 of the system 8 via an Advanced Programmable Interrupt Controller (APIC) bus 11.

The APIC bus 11 typically includes two bidirectional data lines and a clock line. When the interrupt controller 10 desires to communicate a given interrupt request to one or more of the microprocessors 12, the interrupt controller 10 furnishes signals to the APIC bus 11 that indicate such information as an APIC address (which identifies a particular microprocessor 12 to receive and service the interrupt request) and an index to an interrupt table.

The system 8 typically has additional circuitry to facilitate use of the interrupt controller 10. For example, to communicate with the APIC bus 11, each microprocessor 12 typically has a local APIC interface 14. The system 8 might also include a bridge circuit 16 that includes 8259A controllers to provide backward compatibility for older operating systems. This backward compatibility might be needed, for example, when the operating system first boots up the system 8, as described below.

As is typical, some older operating systems expect acknowledgment of interrupt requests over traditional system buses (and not over the APIC bus 11) during bootup of the system. For these older systems, the interrupt controller 10 may interact with the bridge 16 to emulate the response of the older 8259A controller(s) in what is referred to as a virtual wire mode. To accomplish this, during bootup, the interrupt controller 10 sends interrupt requests via messages over the APIC bus 11. However, acknowledgment of interrupt requests occur over the system buses.

Even when not operating in the virtual wire mode, the interrupt controller 10 may transmit interrupt requests to the microprocessor(s) in ways that do not include the APIC bus 11. For example, the interrupt controller 10 may furnish system management interrupt (SMI) requests and non-maskable interrupt (NMI) requests directly to corresponding interrupt SMI and NMI input pins of the microprocessors 12.

The interrupt controller 10 may receive interrupt requests signals from many different sources, such as interrupt request lines of an Industry Standard Architecture (ISA) bus 18, a Peripheral Component Interconnect (PCI) bus (a bus conforming to PCI specification, version 2.0, available from PCI Special Interest Group, Portland, Oreg. 97214, for example (not shown) and/or a motherboard (not shown). All of these interrupt request signals are potential sources for interrupt requests, and each interrupt request signal may be associated with a different interrupt handler. Furthermore, with multiple microprocessors, handling of the different interrupt requests may be assigned to different ones of the microprocessors 12. To keep track of all of the information that is associated with the interrupt request signals, the interrupt controller 10 might include an interrupt request redirection table 20.

Typically, the redirection table 20 includes redirection table entries 21 (redirection table entries having sixty-four bit register locations called RTE[0], RTE[1], RTE[2] . . . RTE[22] and RTE[23], as examples), each of which is associated with a different interrupt request input pin of the interrupt controller 10. Referring to FIG. 2, each redirection table entry 21 may include, for example, a status bit field 28 that indicates a pending interrupt request for the associated input pin. Each redirection table entry 21 may also include a destination bit field 22 that stores a value which identifies the microprocessor(s) 12 to handle interrupt requests originating from the associated pin. An interrupt vector bit field 30 of the redirection table entry 21 may store a value that indicates an interrupt vector. Other bits of each redirection table entry 21, as examples, may specify how (level or edge triggered, as examples) interrupt requests are indicated at the associated input pin, and other bits of the redirection table entry 21 may be used to mask an interrupt request from propagating upstream from the interrupt controller 10 to one of the microprocessors 12.

The redirection table entries 21 are typically not used to store information for interrupt request signals that are generated internally by the interrupt controller 10. As a result, interrupts requests originating from these signals are not communicated to the microprocessors via the APIC bus 11. For example, logic inside the interrupt controller 10 may selectively logically combine signals that are received from some of the interrupt request input pins to generate an output SMI interrupt request signal (called SMIOUT#). Although the SMIOUT# signal appears on an SMI output pin 17 of the interrupt controller 10, an interrupt request indicated by the SMIOUT# signal may not be furnished to the APIC bus 11 because the SMIOUT# signal does not have an associated redirection table entry 21.

However, one way to allocate one of the table entries 21 to the SMIOUT# signal is to route the SMIOUT# signal from the output pin 17 to one of the input pins via an external network. By doing this, the SMIOUT# signal is assigned to the table entry 21 that is associated with the input that receives the SMIOUT# signal from the external network. However, an input pin is consumed for this purpose and external board routing may be required.

The interrupt controller 10 typically scans the table entries 21 one at a time in a round robin fashion to determine if the status bits 28 of an entry 21 indicates a pending interrupt request. As a result of the round robin scanning, the interrupt controller 10 may not immediately attend to a pending interrupt request. The interrupt controller 10 typically scans each entry 21, even if the interrupt request input pin that is associated with that entry is not being used.

Thus, there is a continuing need for an interrupt controller that reduces the latency of such a round robin polling mechanism. There is also a continuing need for an interrupt controller to store information in the redirection table for internally-generated interrupt request signals.

SUMMARY

Generally, in one embodiment, an interrupt controller includes a package that has an input pin for receiving an external interrupt request signal. The interrupt controller also includes interrupt generation logic, a memory and multiplexing logic, all disposed within the package. The interrupt generation logic generates an internal interrupt request signal, and the multiplexing logic selectively stores interrupt information for either the internal or the external interrupt request signal in a location of the memory.

Generally, in another embodiment, an interrupt controller includes conductors for receiving interrupt request signals, a memory, a register and control logic. Each of the interrupt request signals are capable of indicating an interrupt request. The register is writable to identify a set of locations of the memory for scanning. The control logic scans the set of locations for interrupt requests and does not scan other locations of the memory for interrupt requests.

Advantages and other features of the invention will become apparent from the following description, from the drawing and from the claims.

DETAILED DESCRIPTION

Figure 3:
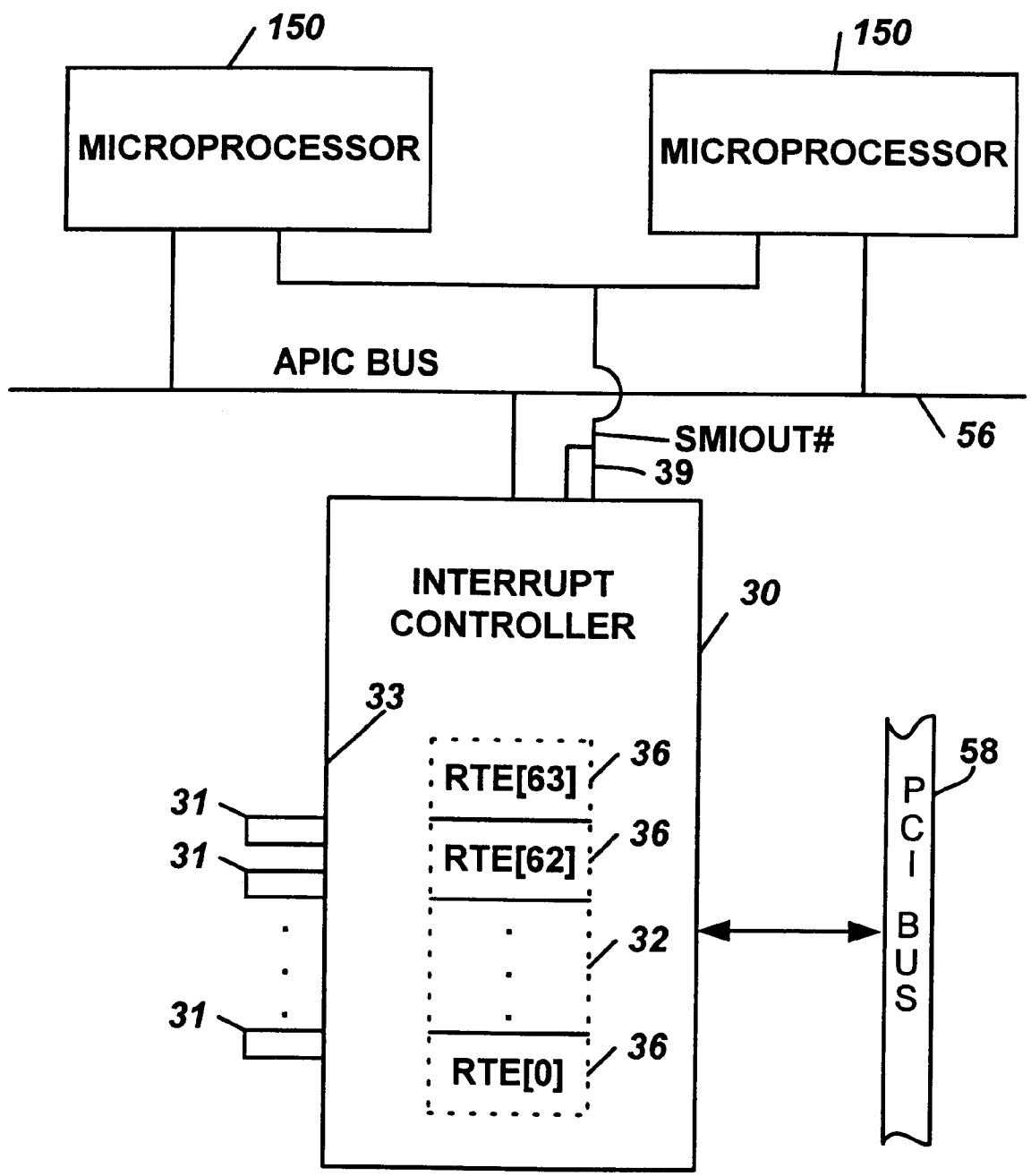
FIG. 3 is a block diagram of a computer system according to an embodiment of the invention.

Referring to FIG. 3, an embodiment 30 of a programmable interrupt controller in accordance with the invention may assign redirection table entries 36 (of a redirection table 32) to both internal interrupt request signals that are generated within the controller 30 and external interrupt request signals that are received by input pins 31 of the controller 30. As a result of this arrangement, an internally generated interrupt request may be communicated to a microprocessor 150 (via an APIC bus 56) without consuming any of the interrupt input pins 31.

Furthermore, as described below, interrupt request signals that are generated internally within the controller 30 may appear on an external interrupt output pin 39 of the controller 30, via a messaging scheme (a message over the the APIC bus 56, for example) or both. The controller 30, in some embodiments, includes a single chip integrated circuit (IC) package 33 that encases the circuitry of the controller 30, and the interrupt request input pins 31 protrude from the package to couple the circuitry to the externally received interrupt request signals. In this context, the terms "internal" and "internally" refer to signals that are generated by circuitry of the controller 30 that is disposed within the package.

The controller 30 may have several other features. For example, to reduce latency involved in connection with scanning the redirection table entries 36, the controller 30 may be constructed to mask out some of the entries 36 from the scanning. The masked redirection table entries may be entries that are not being used to store interrupt information, as described below.

Another feature of the controller 30 is the controller's capability to selectively assign the redirection table entries 36 to either internally generated interrupt request signals or the externally received interrupt request signals. As a result of this arrangement, memory space used to store the table 32 is conserved, as interrupt request input pins that are not being used need not be assigned to any of the redirection table entries 36.

Figure 4:
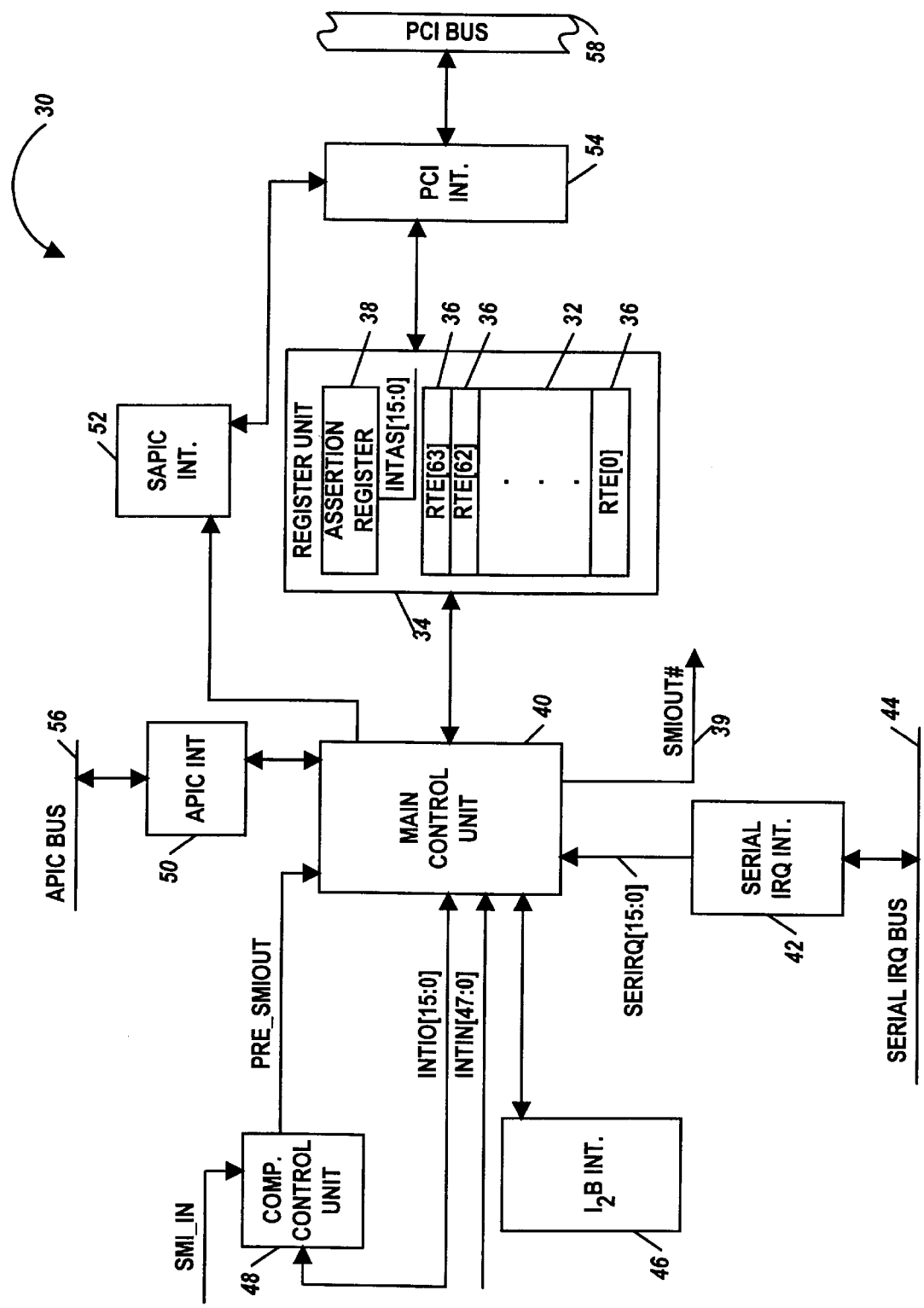
FIG. 4 is a block diagram of an interrupt controller according to an embodiment of the invention.

Referring also to FIG. 4, more specifically, each redirection table entry 36 stores information (information that includes a value representing an interrupt vector that points to an interrupt handler, for example) that is associated with an interrupt request routine signal. The interrupt request signal may be either generated externally by devices other than the controller 30 or generated internally by the controller 30. As an example, the signals from the interrupt request input pins 31 may be logically combined inside the controller 30 to generate an SMI interrupt request signal (called PRE_SMIOUT). Not only may the PRE_SMIOUT signal appear on the external pin 39 of the controller 30 (as a signal called SMIOUT# (wherein the suffix "#" indicates a negative logic regeneration)), the PRE_SMIOUT signal may also be assigned to one of the redirection table entries 36. As a result, interrupt requests originating from the PRE_SMIOUT# signal may be communicated to the APIC bus 56.

In some embodiments, other examples of internally generated interrupt request signals include signals that are furnished by an assertion register 38 of the controller 30. Located in a register unit 34 of the controller 30, the assertion register 38 may furnish, for example, sixteen interrupt request signals (called INTAS[15:0]). The register 38 may be written to by, for example, a bus master device with a value indicating an interrupt request for one of the INTAS[15:0] signals.

For example, in some embodiments, a value of "4" may cause the INTAS[4] signal to indicate an interrupt request, and a value of "15" may cause the INTAS[15] signal to indicate an interrupt request. Depending on the embodiment, these interrupt requests may be indicated by a transition (for an edge triggered interrupt request) or a state (for a level triggered interrupt request) of the interrupt request signal. Although internally generated, each of the INTAS[15:0] signals may be assigned to one of the redirection table entries 36, as described below.

In some embodiments, the controller 30 does not allocate one redirection table entry 36 for each interrupt request signal (whether externally or internally generated), as the number of interrupt request signals may be greater than the number of redirection table entries 36. Instead, the redirection table entries 36 may be used for some of the internally/externally generated interrupt signals to the exclusion of the remaining interrupt request signals. As a result of this arrangement, table space is conserved, scanning time of the redirection table entries 36 may be reduced and unused interrupt request signals or interrupt request input pins may be effectively ignored.

Figure 1:
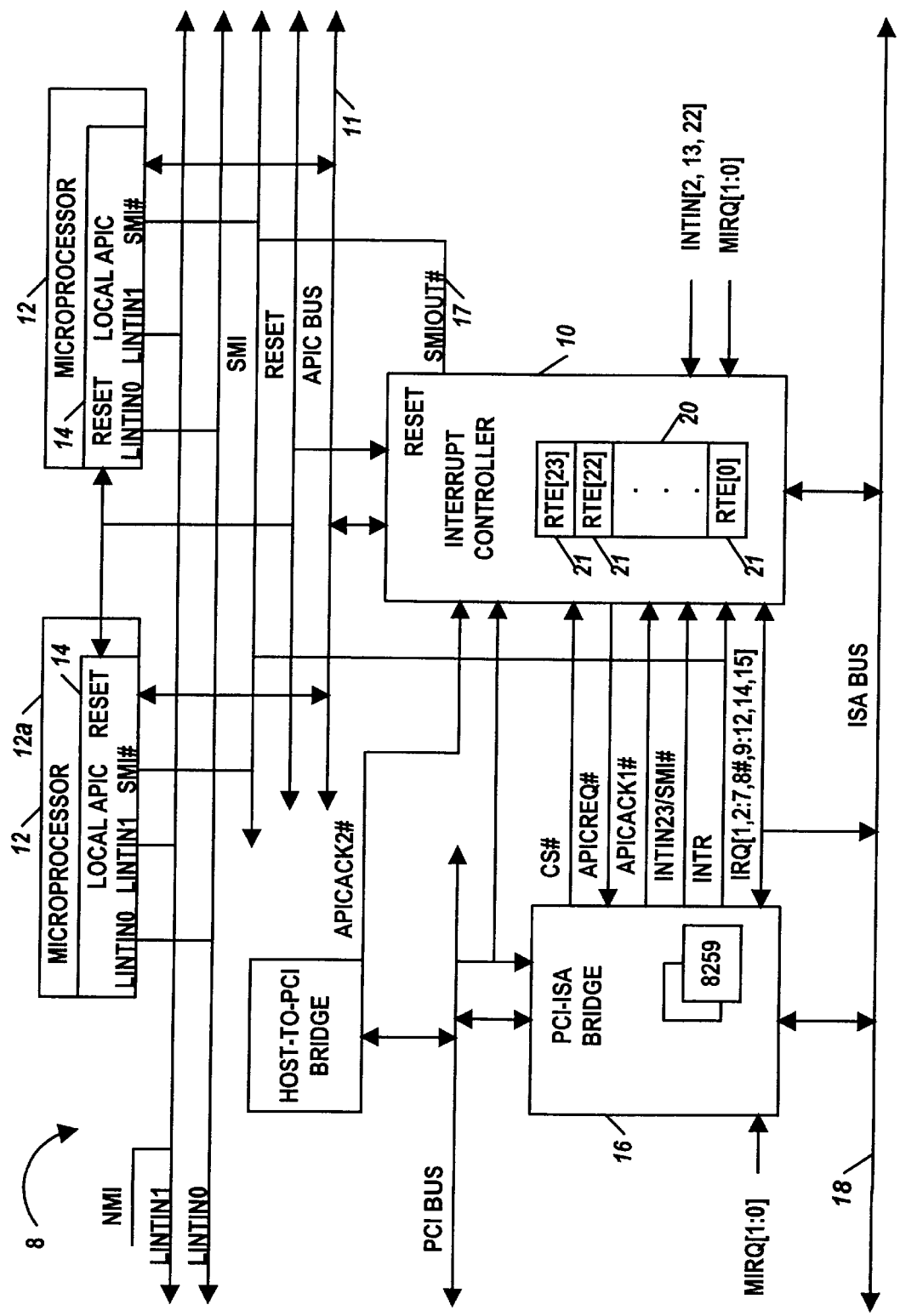
FIG. 1 is a block diagram of a computer system of the prior art.
Figures 2, 5, 6:
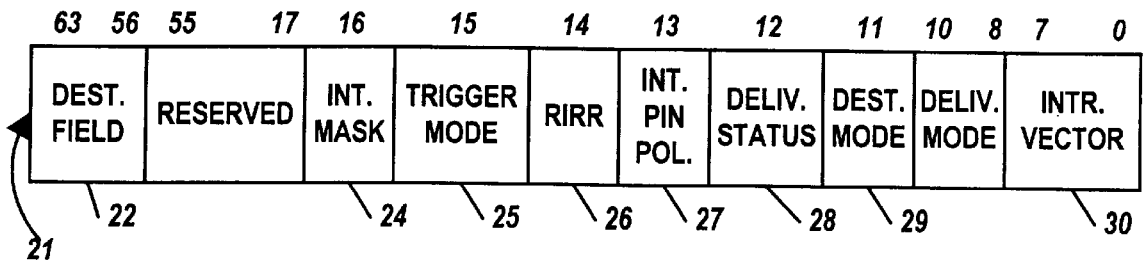
FIG. 2 is a schematic representation of a redirection table entry of an interrupt controller of FIG. 1.
FIG. 5 is a diagram illustrating mapping of the interrupt signals for the interrupt controller of FIG. 4.
FIG. 6 is a table illustrating a scan sequence used by the interrupt controller of FIG. 4.

As an example, referring to FIG. 5, the redirection table 32 may have sixty-four redirection table entries 36 (entries assigned to sixty-four bit register locations RTE[0], RTE[1], RTE[2], . . . and RTE[63], as examples), each of which may be assigned to a different interrupt request signal. The interrupt request signals that are available for assignment include sixteen interrupt request signals (called INTIO [15:0]) that are furnished by interrupt request lines of an ISA bus (not shown) and received by the interrupt request input pins of the controller 30. In some embodiments, the INTIO [15:0] signals are bidirectional. The interrupt request signals also include forty-eight additional interrupt request signals (called INTIN[47:0]) that are furnished by other interrupt sources, such as PCI interrupt request lines and motherboard interrupt request lines, and received by the interrupt request input pins.

Continuing the example, in some embodiments, the redirection table entry 36 having the highest register memory location, RTE[63], may be assigned to store interrupt information for either the INTIN[47] signal, the SMIOUT# signal or the INTAS[15] signal to the exclusion of the other two signals. The redirection table entries 36 having the register memory locations RTE[62:48] may be assigned to store information for either the INTIN[46:32] signals or the INTAS[14:0] signals to the exclusion of the other fifteen signals. The redirection table entries 36 having the register memory locations RTE[47:16] may be assigned to store information for the INTIN[31:0] signals, and the redirection table entries 36 having the register memory locations 36 RTE[15:0] may be assigned to store information for the INTIO[15:0] signals.

As described below, writable (by a microprocessor) register bits (called ASRTEN and SMI63, described below) of a register unit 34 (see FIG. 4) are used to selectively assign the interrupt signals to the desired table entries 36, as described above. Other register bits (called RTEDIS[2:0] (see FIG. 6), described below) of the register unit 34 may be selectively programmed to selectively mask out the entries 36 that are not being used. This may be beneficial, for example, to reduce latency in scanning the entries 36, as one PCI clock cycle is consumed for each entry 36 being scanned, as described below.

If none of the redirection table entries 36 are masked, then scanning incrementally recycles from the lowest register memory location table entry (RTE[0]) to the highest register memory location (RTE[63]), one location at a time.

Referring to FIG. 6, the RTEDIS[2:0] bits, in some embodiments, are used to mask a contiguous block of the redirection table entries 36 from the scanning. In these embodiments, scanning continues from the lowest register memory location (RTE[0]) upwards until a register memory location that is indicated by the RTEDIS[2:0] bits is reached. When this occurs, the scanning skips to the highest register memory location (RTE[63]) and then back to the lowest register memory location (RTE[0]) (on the next PCI clock cycle) to repeat the scanning loop.

Other embodiments are possible. For example, register bits may be used to more specifically designate several contiguous blocks of register memory locations or individually designate register memory locations to mask from the scanning.

Referring back to FIG. 4, to perform the above-described functions, the controller 30 may include a main control unit 40 which receives the interrupt request signals and based on their logical states, maintains, monitors and updates the bits of the table entries 36. The main control unit 40 also furnishes a pointer (called SINDEX[5:0], described below) that is used to point to the memory location of the table 32 being scanned, as described below.

The main control unit 40 receives interrupt request signals and selectively assigns these signals to the table entries 36, as directed by the ASRTEN and SMI63 bits (described above). In this manner, the main control unit 40 receives the INTIO[15:0] signals, the INTIN[47:0] signals, the PRE_ SMIOUT signal and serial interrupt signals (called SERIRQ [15:0] and provided by a serial interrupt request interface 42). The PRE_SMIOUT signal, in some embodiments, is generated from a logical combination of selected ones of the INTIO[15:0] signals. Like the INTIO[15:0] signals, the SERIRQ[15:0] signals indicate the logical states of interrupt lines of an ISA bus (not shown) and are bidirectional. As described below, in some embodiments, a bit (called SSLTEN and described below) of the register unit 34 designates whether the INTIO[15:0] signals are used or whether the SERIRQ[15:0] signals are to be used in their place.

The main control unit 40 communicates with various different types of buses. For example, the main control unit 40 communicates with a serial interrupt bus 44 (to receive the SERIRQ[15:0] signals) via the serial interrupt request interface 42 and communicates with the APIC bus 56 via an APIC interface 50. The main control unit 40 may use a serial bus interface 46 to communicate via a serial bus with other controllers (like the controller 30) that are located in other I/O subsystems (systems that are coupled to different PCI buses, for example). The main control unit 40 may also communicate with a Streamlined APIC (SAPIC) interface 52.

The SAPIC interface 52 may be used to the exclusion of the APIC interface 56 to transmit interrupt information to the microprocessor 12 via a PCI bus 58. A PCI interface 54 of the controller 30 interfaces both the SAPIC interface 52 to the PCI bus 58 and interfaces the register unit 34 to the PCI bus 58.

The controller 30 also includes a compatibility control unit 48 that may, in a compatibility mode, be used to maintain backwards compatibility to legacy controllers, such as the 8259A controller. For example, the compatibility control unit 48 may be used to selectively map the INTIN [47:0] signals to the INTIO[15:0] signals. In some embodiments, the compatibility control unit 48 (based on the contents of a register (not shown) of the register unit 34) selectively logically combines the INTIO[15:0] signals and a SMI signal (called SMI_IN) to generate the PRE_SMIOUT signal.

Figure 7:
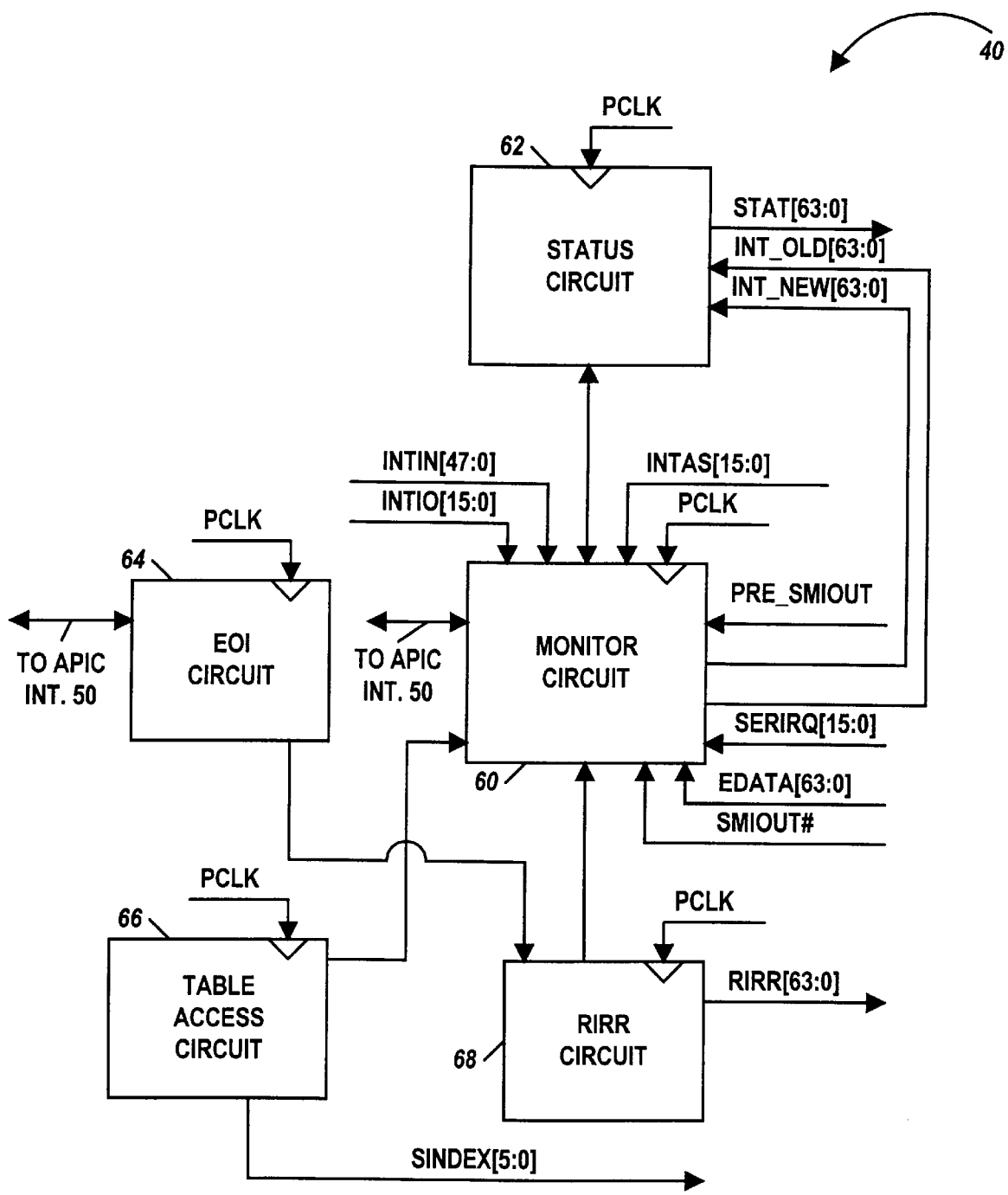
FIG. 7 is a block diagram of a main control unit of FIG. 4.

Referring to FIG. 7, in some embodiments, the main control unit 40 includes a monitor circuit 60 that receives all of the interrupt request signals and passes them through a clock synchronization circuit. In this manner, the monitor circuit 60 synchronizes the interrupt request signals (that have been assigned table entries 36) to a PCI clock (called PCLK) and maps these digital signals to bits in a multibit signal (called INT_NEW[63:0]). The bit position to which an interrupt request signal gets mapped directly corresponds to the memory location of the table entry 36 that is associated with that interrupt request signal. For example, if the INTIN[33] signal is assigned to the table entry 36 having register memory location RTE[49], then the INT_NEW[49] bit indicates the state of the INTIN[33] signal. The monitor circuit 60 also generates a multibit signal (called INT_OLD [63:0]) which is representative of, but lags, the INT_NEW [63:0] signal by one PCI clock cycle.

A status circuit 62 receives the INT_NEW[63:0] and INT_OLD[63:0] signals, and based on the logical states of their bits, detects interrupt request(s). In this manner, the status circuit 62 detects level triggered interrupt requests by observing the logical states of the bits of the INT_NEW [63:0] signal and comparing the states to a predetermined logic level. The status circuit 62 detects edge triggered interrupt requests by observing the states of the bits of both the INT_NEW[63:0] and INT_OLD[63:0] signals to detect the transition of one of the bits. Based on these observations, the status circuit 62 sets or clears bits of a multibit signal (called STAT[63:0]) which is received by the register unit 34. Each different bit of the STAT[63:0] signal is used to furnish the status bit 28 (see FIG. 2) of a different signal corresponding to a given redirection table entry 36.

Still referring to FIG. 6, the main control unit 40 also includes a remote interrupt request register circuit 68 that generates a multibit signal (called RIRR[63:0]). Each bit in the RIRR[63:0] signal is used to update a different one of the RIRR bit fields 26 of a different table entry 36. The RIRR bit fields 26 are not used for edge triggered interrupt requests. However, for level triggered interrupt requests, the RIRR circuit 68 interacts with an end of interrupt (EOI) circuit 64 and the monitor circuit 60 to determine both when a level triggered interrupt request is acknowledged by a local APIC/SAPIC (of a microprocessor) and when an end of interrupt (EOI) message and a matching interrupt vector are received from the local APIC.

The monitor circuit 60 uses a table access circuit 66 to generate the SINDEX[5:0] pointer which selects the table entries 36. The value stored in the entry 36 being pointed to by the SINDEX[5:0] pointer is indicated by a multibit signal (called EDATA[63:0]) which is provided by the register unit 34 and received by the monitor circuit 60.

Figure 8:
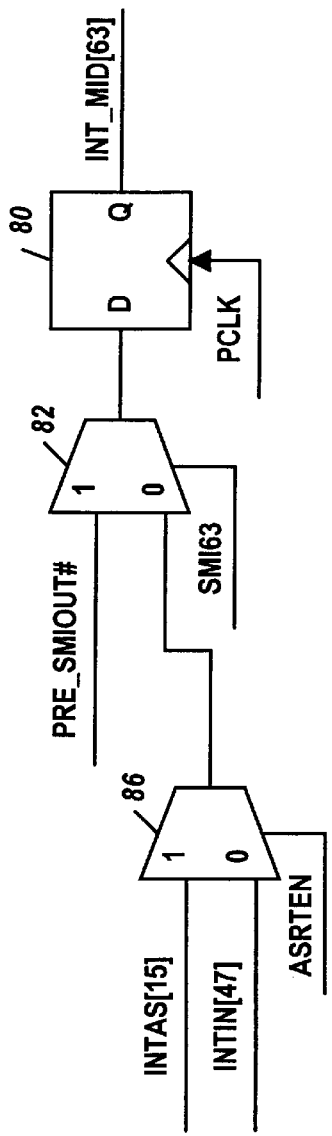
FIGS. 8, 9, 10, 11 and 12 are schematic diagrams of circuitry of a monitor circuit of FIG. 7.

Referring to FIG. 8, the monitor circuit 60 double clocks the interrupt request signals to generate the bits of the INT_NEW[63:0] signal. To accomplish this, the monitor circuit 60 generates an intermediate multibit signal (called INT_MID[63:0]) that represents the INT_NEW[63:0] signal delayed by one PCI clock signal. In this manner, the monitor circuit 60 includes a D-type flip-flop 80 which furnishes the INT_MID[63] bit and is clocked by the PCLK signal. The configuration bit SMI63, when asserted, or high, selects (via a multiplexer 82) the inverted PRE_SMIOUT signal (PRE_SMIOUT#) for routing to the input terminal of the flip-flop 80. If the SMI63 configuration bit is deasserted, or low, then the multiplexer 82 routes the output signal of a multiplexer 86 to the input terminal of the flip-flop 80. The output signal furnished by the multiplexer 86 is controlled by the logical state of the ASRTEN configuration bit. The ASRTEN bit when asserted, or high, causes the multiplexer 86 to select the INTAS[15] signal as its output signal and when deasserted, causes the multiplexer 86 to select the INTIN[47] signal as its output signal.

Figure 9:
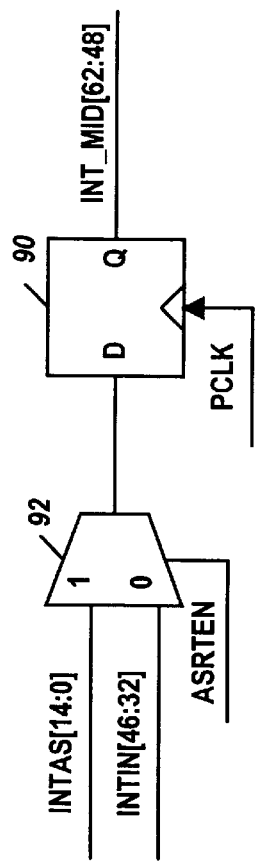

Referring to FIG. 9, the monitor circuit 60 also includes a multibit, D-type flip-flop 90 that is clocked by the PCLK signal and furnishes the INT_MID[62:48] bits. The input terminals of the flip-flop 90 are coupled to output terminals of a multibit multiplexer 92. The selection by the multiplexer 92 is governed by the logical state of the ASRTEN configuration bit. When the ASRTEN configuration bit is asserted, or high, then the multiplexer 92 routes the INTAS [14:0] signals to the input terminals of the flip-flop 90, and when the ASRTEN configuration bit is deasserted, or low, the multiplexer 92 routes the INTIN[46:32] signals to the input terminals of the flip-flop 90.

Figure 10:
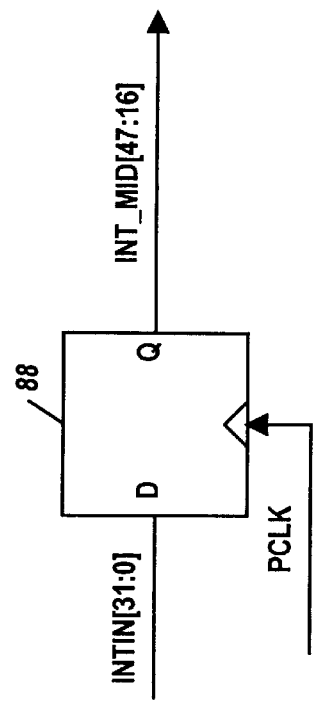

As shown in FIG. 10, the INT_MID[47:16] bits are furnished by a multibit, D-type flip-flop 88 which receives the INTIN[31:0] signals (at the input terminals of the flip-flop 88) and is clocked by the PCLK signal.

Figure 11:
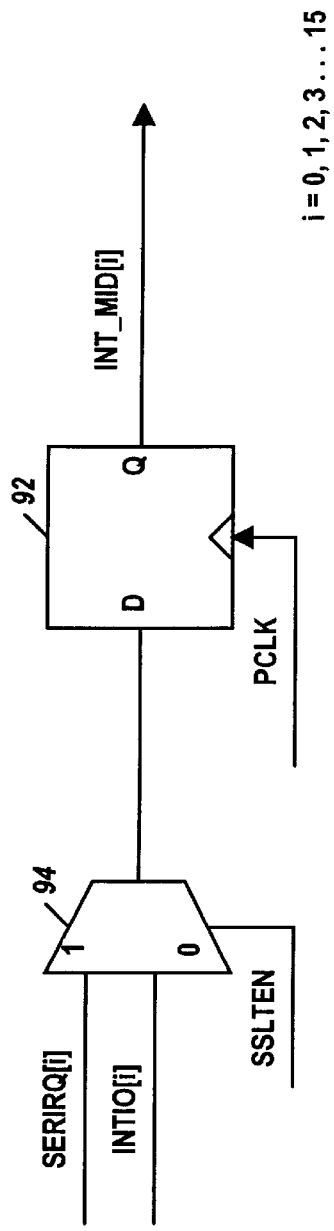

Referring to FIG. 11, the INT_MID[15:0] bits are furnished by a multibit, D-type flip-flop 92 which is clocked by the PCLK signal. The input terminals of the flip-flop 92 are coupled to the output terminals of a multibit multiplexer 94. The selection by the multiplexer 94 is governed by the logical state of the SSLTEN configuration bit. In this manner, the logical state of the SSLTEN bit determines whether the multiplexer 94 routes the SERIRQ[15:0] signals (for the SSLTEN bit being asserted, or high) or the INTIO [15:0] signals (for the SSLTEN bit being deasserted, or low) to the input terminals of the flip-flop 92.

Figure 12:
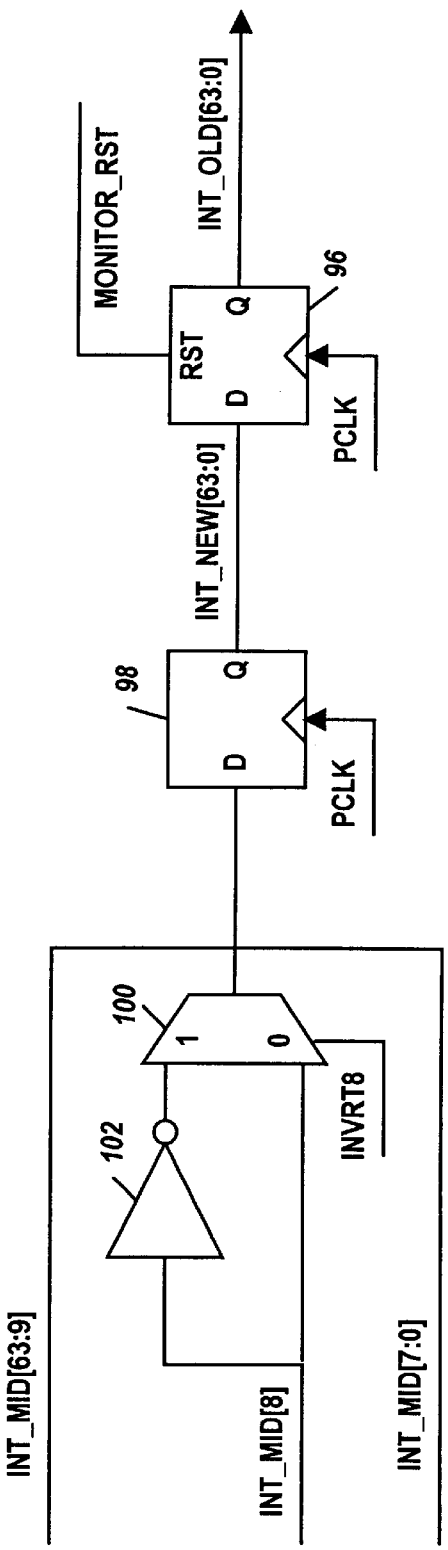

Referring to FIG. 12, the INT_NEW[63:9] and INT_NEW[7:0] bits are furnished by a multibit, D-type flip-flop 98 which receives the INT_MID[63:9] and INT_MID[7:0] bits and is clocked by the PCLK signal. The interrupt request indicated by the INT_NEW[8] bit may or may not be inverted depending on the level of a configuration bit (called INVRT8) which controls the selection of a multiplexer 100. When the INVRT8 bit is asserted, or high, the multiplexer 100 routes the INT_MID[8]# bit to the corresponding input terminal of the flip-flop 98. Otherwise, the multiplexer 100 routes the noninverted INT_MID[8] bit to this input terminal.

The flip-flop 98 furnishes the INT_NEW[63:0] bits which are received by the input terminals of a multibit, D-type flip-flop 96. The flip-flop 96 furnishes the INT_OLD[63:0] signal at its output terminals and is clocked by the PCLK signal.

Figure 13:
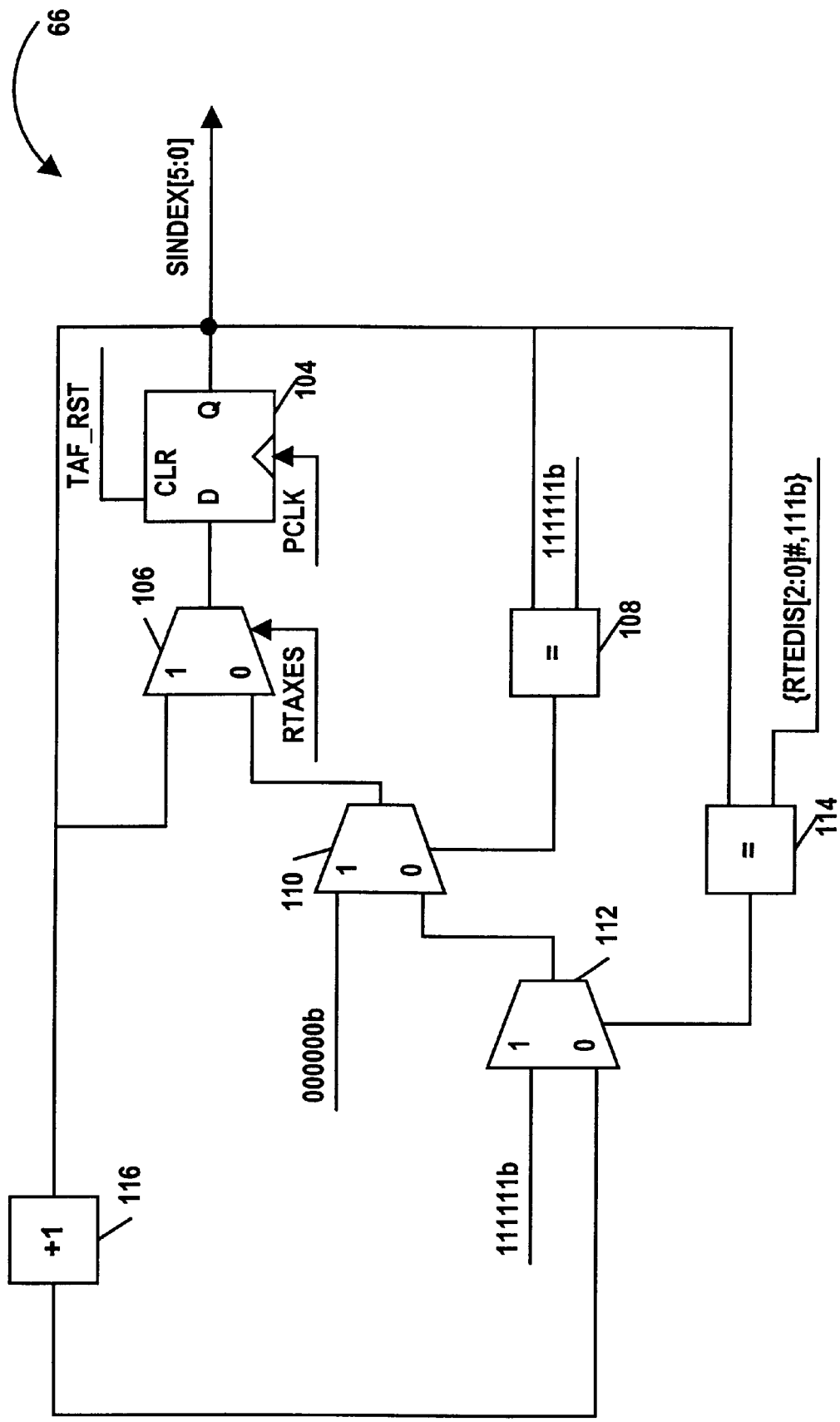
FIG. 13 is a schematic diagram of circuitry of a table access circuit of FIG. 7.

Referring to FIG. 13, the table access circuit 66 includes a multibit, D-type flip-flop 104 that furnishes the SINDEX [5:0] pointer signal at its out terminals and is clocked by the PCLK signal. When a signal (called RTAXES) is asserted, or high, this indicates that the PCI interface 54 is accessing the register unit 34. Upon this occurrence, a multibit multiplexer 106 routes the SINDEX[5:0] pointer signal back to the input terminals of the flip-flop 104 to preserve the current value indicated by the SINDEX[5:0] pointer signal. When the RTAXES signal is deasserted, or low, the multiplexer 106 routes a multibit output signal of a multiplexer 110 to the input terminals of the flip-flop 104.

The selection by the multiplexer 110 is controlled by the output signal of a multibit comparison circuit 108. The comparison circuit 108 compares the value represented by the SINDEX[5:0] pointer signal to a value "111111b" (wherein the suffix "b" indicates a binary representation) which indicates the maximum permissible value (i.e., 63) that the SINDEX[5:0] pointer signal may indicate. When this maximum value is reached, the comparison circuit 108 asserts its output signal which cause the multiplexer 110 to route a multibit signal indicative of "000000b" to the input terminals of the flip-flop 104.

If the value indicated by the SINDEX[5:0] pointer signal has not reached the maximum value, then the multiplexer 110 routes a multibit signal that is provided by the output terminals of another multibit multiplexer 112 to the input terminals of the flip-flop 104. The selection by the multiplexer 112 is controlled by an output signal of a multibit comparison circuit 114.

The comparison circuit 114 receives at one set of input terminals the SINDEX[5:0] signal and at the other set of input terminals a concatenated signal. The three most significant bits of the concatenated signal are indicative of an inverted version of the RTEDIS[2:0] bits, and the three least significant bits of the concatenated signal are indicative of "111b." When the value indicated by the SINDEX[5:0] signal equals the value represented by the concatenated signal, then the multiplexer 112 equates the SINDEX[5:0] signal equal to "111111b" by routing a multibit signal that is indicative of "111111b" to the input terminals of the flip-flop 104. However, if not, then the multiplexer 112 routes the output terminals of a plus-one-counter 116 to the input terminals of the flip-flop 104. The plus-one-counter 116 receives the SINDEX[5:0] signal, asynchronously increments the value represented by this signal by one, and then furnishes a multibit output signal to indicate the resultant sum.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. An interrupt controller comprising:

conductors that receive interrupt request signals, each of the interrupt request signals being capable of indicating an interrupt request;

a memory including locations capable of storing information about the interrupt request signals;

a register writable to identify a first set of the locations for scanning and a second set of the locations; and control logic to scan the first set of locations for interrupt requests and not scan the second set of locations for interrupt requests.

2. The interrupt controller of claim 1, wherein the first set of locations comprises a contiguous block of locations.

3. The interrupt controller of claim 1, wherein the information comprises interrupt request status information.

4. The interrupt controller of claim 1, wherein the control logic reads the first set of locations to detect the interrupt requests, the interrupt controller further comprising:

an interface circuit to notify a microprocessor when the control logic detects one of the interrupt requests.

5. A method comprising:

receiving interrupt request signals, each of the interrupt request signals being capable of indicating an interrupt request;

allocating memory locations to store information about the interrupt request signals;

storing scanning information identifying a set of the memory locations to be scanned; and scanning the set of the memory locations to detect the interrupt requests and not scanning the remaining memory locations.

6. The method of claim 5, wherein the scanning comprises:

traversing a contiguous block of the locations.

7. The method of claim 5, wherein the scanning comprises:

reading the set of locations to detect the interrupt requests; and notifying a microprocessor when the one of the interrupt requests is detected.

8. An interrupt controller comprising:

conductors to receive indications of external interrupt requests;

assertion logic to generate indications of internal interrupt requests;

an interrupt request information memory including locations to store information about the internal interrupt requests and the external interrupt requests;

register bits to provide logical indications to selectively mask out locations of the memory to not be scanned; and control logic to scan the locations in memory based upon the logical indications.

9. The interrupt controller of claim 8, wherein the information comprises interrupt request status information.

10. The interrupt controller of claim 8, wherein the control logic scans the unmasked memory locations to detect one of the interrupt requests.

11. The interrupt controller of claim 10, further comprising:

an interface circuit to notify a microprocessor when the control logic detects one of the interrupt requests.

12. The interrupt controller of claim 8, wherein the assertion logic comprises an assertion register writable to store a value indicative of the internal interrupt requests.

13. The interrupt controller of claim 12, wherein the value may be changed by a device external to the interrupt controller.

14. A method comprising:
allocating memory locations to store interrupt information;
receiving a first plurality of interrupt request signals;
generating a second plurality of interrupt request signals;
identifying a selection of the first and second plurality of interrupt request signals;
storing interrupt information for the identified selection in the memory locations; and
scanning the memory locations to retrieve interrupt information based on the identifying.

15. The method of claim 14, further comprising:
notifying a processor when the interrupt information indicates an interrupt request.

16. The method of claim 14, wherein the scanning comprises:
reading the locations to detect interrupt requests; and
notifying a microprocessor when one of the interrupt requests is detected.

17. An interrupt controller comprising:
conductors that receive interrupt request signals, each of the interrupt request signals being capable of indicating an interrupt request;
a memory including contiguous locations capable of storing information about the interrupt request signals;
a register writable to identify a first non-contiguous set of the locations for scanning and a second set of the locations; and
control logic to scan the first set of locations for interrupt requests and not scan the second set of locations for interrupt requests.

18. The interrupt controller of claim 17, wherein the information comprises interrupt request status information.

19. The interrupt controller of claim 17, wherein the control logic reads the first set of locations to detect the interrupt requests, the interrupt controller further comprising:
an interface circuit to notify a microprocessor when the control logic detects one of the interrupt requests.

20. The interrupt controller of claim 17, further comprising interrupt generation logic to generate an internal interrupt request signal.

21. The interrupt controller of claim 20, wherein the interrupt generation logic comprises:
an assertion register storing a value; and
assertion logic to generate the internal interrupt request signal based on the value.

22. The interrupt controller of claim 21, wherein the interrupt generation logic receives at least one of the external interrupt requests.

23. The interrupt controller of claim 20, wherein the internal interrupt request signal comprises a system management interrupt signal.

24. The interrupt controller of claim 17, further comprising an interface circuit to transmit the interrupt information to a microprocessor when the signal for which the information is stored indicates an interrupt request.

25. A method comprising:
receiving interrupt request signals, each of the interrupt request signals being capable of indicating an interrupt request;
allocating contiguous memory locations to store information about the interrupt request signals;
storing scanning information identifying a non-contiguous set of the memory locations to be scanned; and
scanning the set of the memory locations to detect the interrupt requests and not scanning the remaining memory locations.

26. The method of claim 25, wherein the scanning comprises:
reading the set of locations to detect the interrupt requests; and
notifying a microprocessor when the one of the interrupt requests is detected.

* * * * *